(12) United States Patent
Damm et al.

(10) Patent No.: US 7,841,423 B2
(45) Date of Patent: Nov. 30, 2010

(54) REAR CHASSIS FOR A GRADER

(75) Inventors: Jurgen Damm, Berlin (DE); Harald Schwartz, Fahrland (DE)

(73) Assignee: CNH Baumaschinen GmbH, Berlin (DE)

( * ) Notice: Subject to any disclaimer, the term of this patent is extended or adjusted under 35 U.S.C. 154(b) by 492 days.

(21) Appl. No.: 10/539,895

(22) PCT Filed: Dec. 2, 2003

(86) PCT No.: PCT/DE03/03964

§ 371 (c)(1),
(2), (4) Date: Feb. 13, 2006

(87) PCT Pub. No.: WO2004/057116

PCT Pub. Date: Jul. 8, 2004

(65) Prior Publication Data

US 2006/0151187 A1 Jul. 13, 2006

(30) Foreign Application Priority Data

Dec. 18, 2002 (DE) ................................. 102 59 183

(51) Int. Cl.
*E02F 9/18* (2006.01)
(52) U.S. Cl. ....................................... 172/611; 280/759
(58) Field of Classification Search ................. 172/780, 172/781, 788, 789, 810, 611; 280/757, 759
See application file for complete search history.

(56) References Cited

U.S. PATENT DOCUMENTS

| | | | | |
|---|---|---|---|---|
| 2,967,718 A * | 1/1961 | Orwig | ......................... | 280/759 |
| 2,986,827 A * | 6/1961 | Peterson | ..................... | 172/816 |
| 2,991,110 A * | 7/1961 | Milner | ........................ | 293/126 |
| 3,023,024 A * | 2/1962 | McAdams et al. | ........... | 280/759 |
| 3,490,787 A * | 1/1970 | Lacey et al. | ................... | 280/759 |
| 3,568,778 A * | 3/1971 | Swisher et al. | ............... | 172/785 |
| 3,853,231 A * | 12/1974 | Luttrell | ........................ | 414/719 |
| 4,068,876 A * | 1/1978 | Muellner | ..................... | 293/106 |
| 4,580,811 A * | 4/1986 | Wykhuis et al. | .............. | 280/759 |
| 4,664,404 A * | 5/1987 | Schultz | ..................... | 280/461.1 |
| 5,462,309 A * | 10/1995 | Jeffers et al. | ................. | 280/759 |
| 7,152,883 B2 * | 12/2006 | Niemela | ...................... | 280/759 |

* cited by examiner

*Primary Examiner*—Thomas B Will
*Assistant Examiner*—Joel F. Mitchell
(74) *Attorney, Agent, or Firm*—Patrick M. Sheldrake; Michael G. Harms

(57) ABSTRACT

A road grader having the components or assemblies of a rear counterweight, lights and a bumper. This rear frame should consist of few individual parts, render possible a simple assembly for the rear counterpoise weight and offer sufficient options for building on different pieces of rear-mounted equipment. That is achieved if the bumper and the rear counterweight consist of a rear end plate vertically aligned and extending across the entire width of the grader, which represents the rearmost part of the rear frame and onto which the lighting is attached in the region of its outer ends.

7 Claims, 4 Drawing Sheets

REAR CHASSIS FOR A GRADER

BACKGROUND OF THE INVENTION

The present invention relates generally to road graders and, more particularly, to a rear frame for a road grader. The grader concerned is the type that is employed most generally in road construction work to produce level surfaces of all kinds, and which includes the components or subassemblies of the rear section of the vehicle such as the bumper, rear lights, and frame components.

For the currently employed graders from the production range of the manufacturer CNH known by the type designations "F 106.5" and "F 156", their backup lights are bolted onto the side of the rear frame. Because, in the absence of a rear-mounted implement, it is absolutely necessary for a grader to optimize axle load distribution between the front axle and the rear tandem axle, the bumper is raised up from below into the rear frame and fixed thereto with several bolts or screws. The bumper is formed from a strong end section of the rear frame itself.

Regarding the current methods of construction, they are frequently criticized on the one hand because too man individual parts are required, which complicates the design of the rear frame and for that reason leads to high production consists. On the other hand, the rear counterweight, because of its unfavorable point of attachment, is capable of being assembled only with considerable difficulty. Furthermore, it is a disadvantage that the rear frame, because of its actual function and its shape, offers too few options for the mounting of various types of rear equipment, thus limiting its flexibility for the use of rear-mounted equipment. Finally, rear frame designed in such a way is also not exactly advantageous from point of view of visual appearance or aesthetics.

It would be a great advantage to provide a rear frame that overcomes the above problems and disadvantages.

SUMMARY OF THE INVENTION

Accordingly, it is an object of the present invention to provide an improved grader rear frame that avoids the above-noted disadvantages.

It is another object of the present invention to provide a grader rear frame that consists of few individual parts, where the point of attachment for the rear counterweight lies favorably from the point of view of simple assembly and disassembly, which offers the facility for the attachment of different pieces of rear-mounted equipment and which also still possesses an attractive appearance.

It is a further object of the present invention to provide a grader rear frame that, through the uniting of the functions of the bumper and the rear counterweight in a vertically aligned rear end plate extending across the entire breadth of the grader, brings about a reduction in the number of individual parts for the rear frame. The rear end plate, because of its arrangement right at the rear of the rear frame, assumes the function of a bumper. Its great width protects the entire rear part of the grader from damage and its high weight takes care of the corresponding effectiveness of the protective function. The integration of the backup and brake lights into the area of the outer ends of the rear end plate likewise does not require any extra parts and furthermore offers a more secure protection for the lights against damage or destruction.

It is a further object of the present invention to provide a grader rear frame wherein he rear end plate is formed as one piece.

It is a further object of the present invention to provide a grader rear frame wherein the design is such that a lighter grade/thickness metal can be used for the rear end plate, even when a heavy piece of rear-mounted equipment is deployed, all while maintaining the optimum axle load distribution between the front wheels and the tandem rear axle.

It is a still further object of the present invention to provide a grader rear frame embodiment that permits a greater thickness in the material of which the rear end plate is constructed when lighter or no rear-mounted equipment.

It is an even still further object of the present invention to provide a grader rear frame that increases the stability of the left and right longitudinal beams by joining them together by a rear transverse beam.

It is an even still further object of the present invention to provide a grader rear frame wherein the rear end plate is fixed to the rear transverse beam, mentioned above, by screws or bolts so that it is easily removable.

These and other objects are achieved by providing a grader rear frame that requires a small number of individual parts, and this exhibits lowered production costs. Through the position of the rear en plate on the free end of the rear frame, it can also be installed and dismantled very easily. The large build of the rear end plate offers several technically simple options for the attachment of numerous pieces of rear-mounted equipment, as a result of which the flexibility for this is increased. Finally, the clear and simply organized construction of this rear frame offers an attractive appearance.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
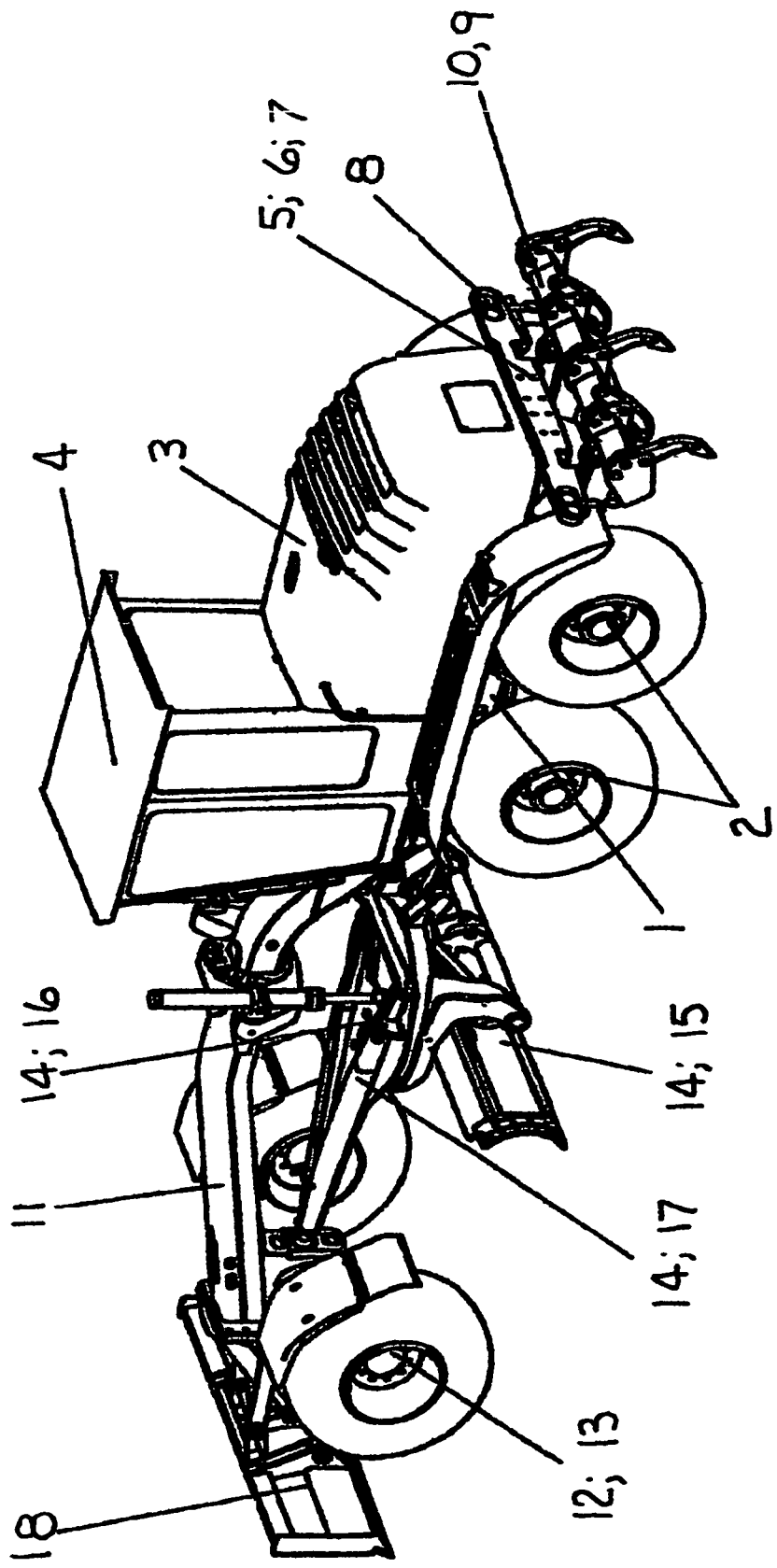
FIG. 1 is a perspective view of the left rear side of a grader with a rear-mounted ripper.

In FIG. 1 a complete grader is shown in which its vehicle part consists essentially of a tandem axle 2 attached to the rear frame 1, an engine compartment 3 with engine (not shown), a driver's cab 4 and a rear end plate 5 belonging to the rear frame 1. This rear end plate 5 is at the same time the rear counterpoise or counterweight 6, bumper 7 and the point of attachment for the lights 8 for the grader. In this example embodiment, a rear-mounted ripper 9 is fixed onto the rear frame 1, which represents the most frequently occurring piece of rear-mounted equipment 10, which includes, for example, a vibratory plate (not shown).

The front part of the grader is formed from the front frame 11, which is supported above the front axle 12, and the front wheels 13 upon the ground. Beneath the front frame 11, the implement 14 is arranged, which consists of the share 15, the slewing gear 16 and the swivel seating 17. An optional front dozer blade 18 arranged in front of the front wheels 13 us carried on the front flame 11.

Figure 2:
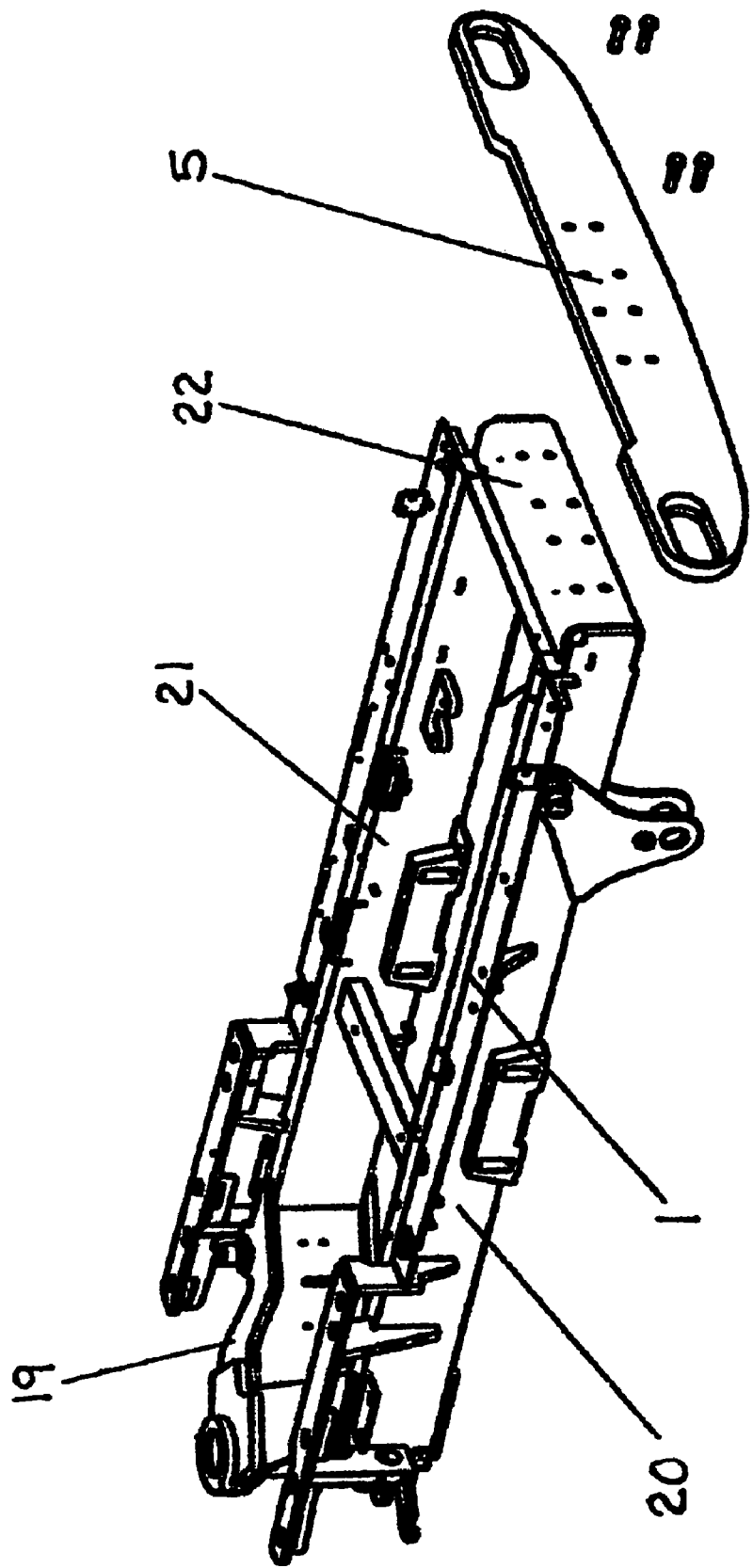
FIG. 2 is an exploded perspective view of the rear frame and the rear end plate of the grader of FIG. 1.

FIG. 2 shows the rear frame 1 and the rear end plate 5 of the grader of FIG. 1 as an exploded diagram. In this case, the rear frame 1 is designed in a box shape, consisting of a head piece 19, a left longitudinal beam 20, a right longitudinal beam 21 and a rear transverse beam 22 connecting both ends of the longitudinal beams 20 and 21.

Figure 3:
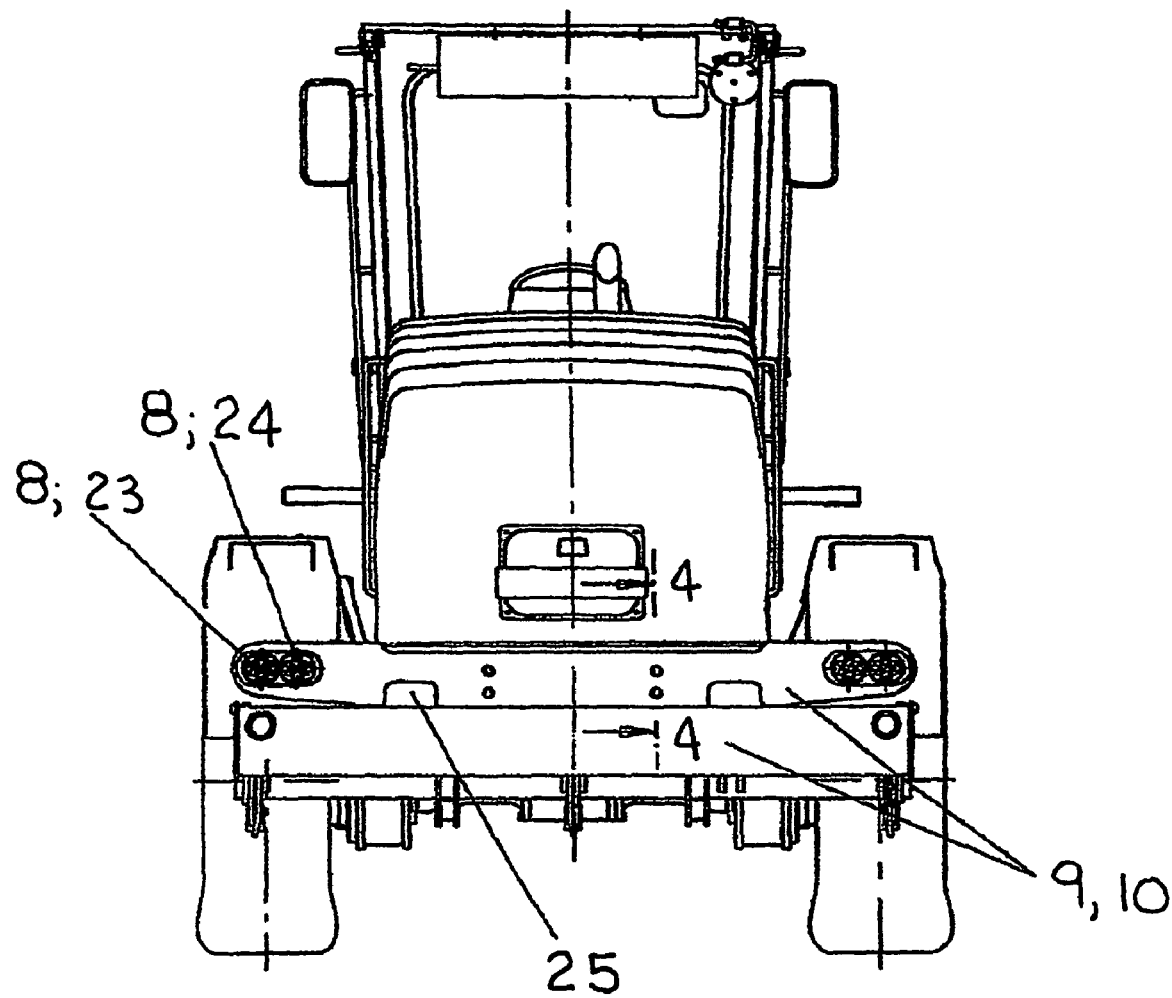
FIG. 3 is a rear view of the grader of FIG. 1 with a rear-mounted ripper and a sectional view through the rear end plate.
Figure 4:
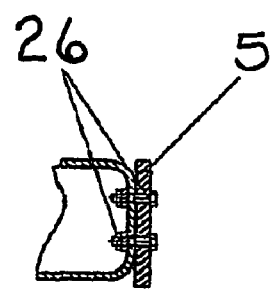
FIG. 4 is an enlarged section view through the rear end plate of the grader of FIG. 3.

In FIG. 3, the rear view of the grader shown in FIGS. 1 and 2 is depicted, which is envisaged for use with a rear-mounted implement 10 having a high or heavy weight. Therefore, here the rear end plate 5 has a relatively small wall thickness, in order, together with a heavy piece of rear-mounted equipment 10, for example a rear-mounted ripper 9, to provide an optimum axle load distribution for the grader. To be seen well here is also, lighting 8 is integrated into the rear end plate 5, where on both sides at its outer ends a combined brake light/tail light and flasher 23 and inside as well a reversing light are located. To enable the ripping cylinder for the on both sides at its outer ends a combined brake light/tail light and flasher 23 and inside as well a reversing light are located. To enable the ripping cylinder for the rear-mounted ripper 9 to pass through the rear end plate, the rear end plate has been equipped with recesses 25. For the releasable attachment of the rear end plate 5 on the rear transverse beam 22 there are several screwed or bolted connections 26 as shown in FIG. 1

Figure 5:
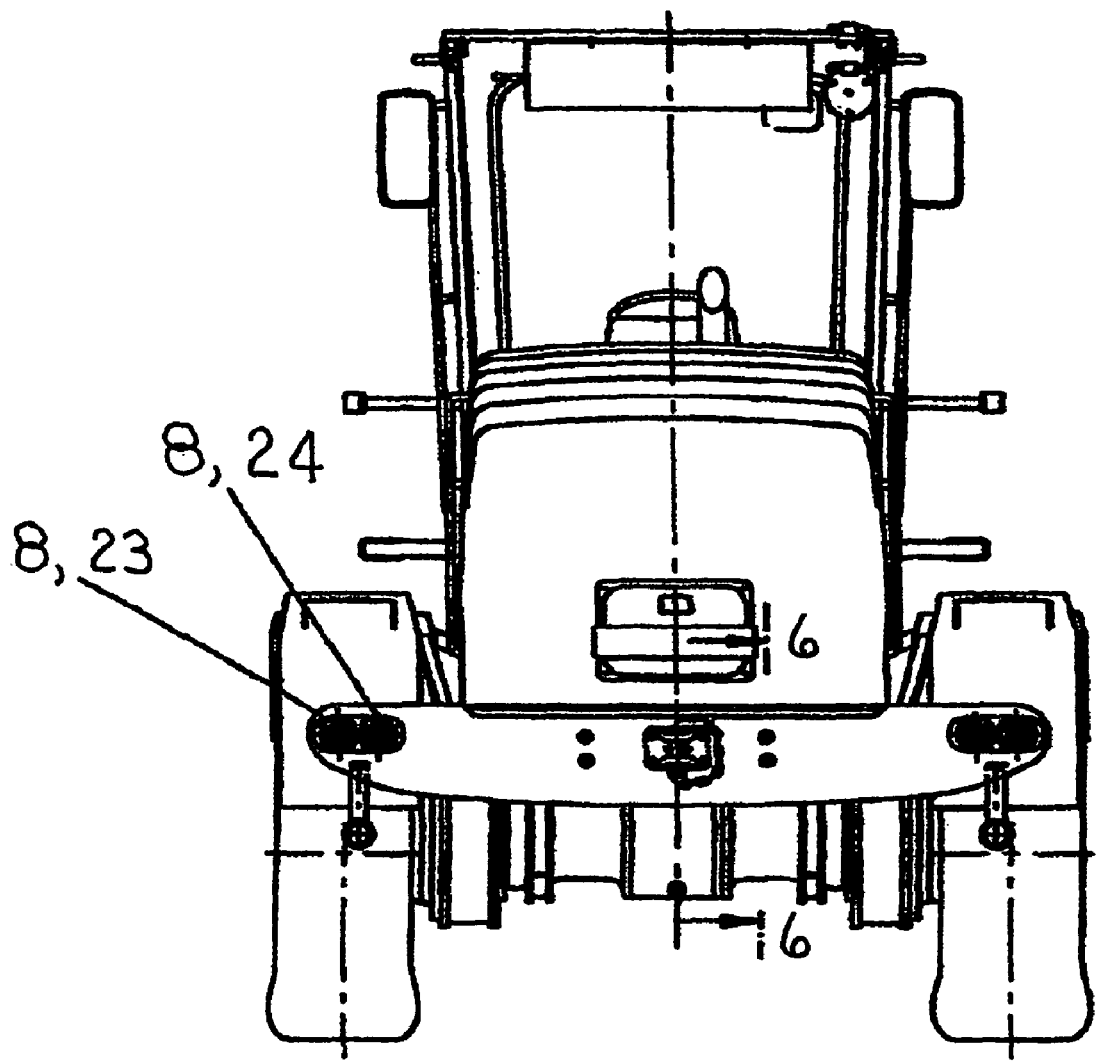
FIG. 5 is a rear view of a grader without rear-mounted equipment with a rear end plate of great wall thickness and FIG. 6 is an enlarged sectional view through the rear end plate of the grader of FIG. 5.
Figure 6:
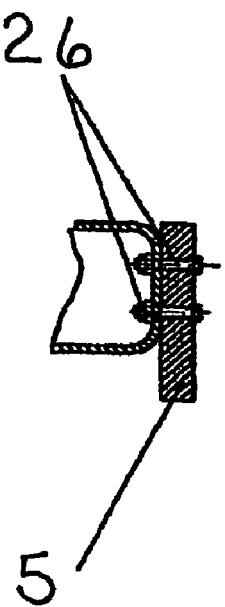

A second example embodiment of a grader in accordance with the invention for deployment without a rear-mounted implement 10 is shown in FIG. 5 where the rear end plate 5 has a considerably greater wall thickness than in the first example. For the releasable attachment of the rear end plate 5 having a larger wall thickness on the rear transverse beam 22 several screwed or bolted connections 26 are similarly used as shown in FIG. 6.

Naturally, the invention is not limited to the foregoing embodiments, but it can also be modified in many ways without departing from the basic concepts.

Having thus described the invention, what is claimed is:

1. In a road grader having a rear frame including left and right longitudinal beams, each having a rear end, and providing for the components or subassemblies of a rear counterweight, lights and a bumper, the improvement comprising:

the bumper and the rear counterweight having a first and second configuration and comprised of a first or a second generally flat elongate rear end plate having opposing outer end regions and extending across the entire width of the grader;

in a first configuration the first rear end plate exhibits a small wall thickness and is connected to the grader in combination with a rear-mounted piece of equipment of a high weight and in a second configuration the second rear end plate exhibits a greater wall thickness than the wall thickness of the first rear end plate and is connected to the grader in combination with a rear-mounted piece of equipment of a lower weight than the piece of equipment of the first configuration or without any rear-mounted equipment;

the rear end plates viewed in the direction of travel of the grader constitutes the rearmost part of the rear frame and are removably attached to the rear transverse beam; the first and second rear end plates having similar opposing outer end portions and openings through the outer end portions and backup/brake and flasher lights are fitted therein such that the lights do not extend beyond the end of the frame; and wherein in both configurations the rear end plate are similarly mounted directly above the piece of equipment of high or low weight, attached to the frame, such that an axle load distribution of the grader is generally maintained between the first and second configurations.

2. The improvement of claim 1, wherein:

the rear end plate is formed as one piece.

3. The improvement of claim 1, wherein:

the rear ends of the left longitudinal beam and the right longitudinal beam are joined to a rear transverse beam.

4. A road grader comprising:

a wheel-supported main frame having a front end and an opposing rear end as determined by the normal direction of travel, the main frame comprised of joined front and rear frames;

an engine and a driver's cab supported on said main frame;

a vertically adjustable ground-engaging blade supported by said main frame;

the rear frame having left and right longitudinal beams generally parallel and in the general same horizontal plane, each with a rear end;

a generally flat elongate first rear end plate jointed to the rear end of each of the right and left longitudinal beams; the first rear end plate constituting the rearmost part of the rear frame and extending generally the width of the road grader;

a first rear mounted piece of ground engaging equipment is mounted to the rear frame directly below the first rear end plate; the first rear end plate having openings therethrough along a bottom edge of the plate to allow rear-mounted equipment to pass from a position below the first rear end plate through a lower portion of the first rear end plate; and the grader having a first and second counterweight configuration, in the first configuration the first rear end plate has a first weight and attached to the grader in combination with the first rear-mounted piece of equipment of a high weight and the second configuration wherein the rear end plate is replaced by a second end plate that exhibits a greater weight than the first rear end plate and is attached to the grader in combination with a second rear-mounted piece of equipment of a lower weight than the first rear-mounted equipment or without any rear-mounted equipment such that an axle load distribution is generally maintained between the first and second configuration, wherein both the first and second rear end plates have similar opposing outer end portions and openings through the outer end portions such that backup/brake and flasher lights can extend through, wherein the lights do not extend beyond the openings in the end plates.

5. The road grader of claim 4, wherein:

the rear end plate is formed as one piece.

6. The road grader of claim 4, wherein:

the rear end plate is made of heavy gauge steel.

7. A method for maintaining an improved axle load distribution between front wheels and an axle of a road grader having a rear frame including left and right longitudinal beams, each having a rear end, a bumper and counterweight of the grader comprising a generally flat elongate end plate extending across the width of the grader and connected to the rear end of the longitudinal beams, the steps comprising:

removing a first rear end plate having a first weight and first wall thickness from an end of the grader;

attaching a rear mounted piece of equipment to the end of the grader; and attaching a second end plate having a second weight less that the first weight and a second thickness less than the first wall thickness to the end of the grader wherein the rear end plates viewed in the direction of travel of the grader constitutes the rearmost part of the rear frame and are removably attached to the grader; the first and second rear end plates having similar opposing outer end portions and openings through the outer end portions and backup/brake and flasher lights are fitted therein such that the lights do not extend beyond the end of the frame; and wherein in both configurations the rear end plate are similarly mounted directly above the piece of equipment of high or low weight, attached to the frame, such that an axial load distribution of the grader is generally maintained between the first and second configurations.

* * * * *